US012561429B2

(12) United States Patent
Yadav et al.

(10) Patent No.: US 12,561,429 B2
(45) Date of Patent: Feb. 24, 2026

(54) METHODS AND SYSTEMS FOR AUTOMATIC GRADING, IMPACT ANALYSIS AND MAPPING TO THE CIA TRIAD

(71) Applicant: Theom, Inc., San Jose, CA (US)

(72) Inventors: Navindra Yadav, Cupertino, CA (US); Supreeth Hosur Nagesh Rao, Cupertino, CA (US); Ravi Sankuratri, Cupertino, CA (US); Danesh Irani, San Carlos, CA (US); Alok Lalit Wadhwa, Milipitas, CA (US); Vasil Dochkov Yordanov, San Jose, CA (US); Venkateshu Cherukupalli, West Windsor, NJ (US); Yiwei Wang, San Jose, CA (US); Zhiwen Zhang, San Jose, CA (US); Udayan Joshi, Cupertino, CA (US)

(73) Assignee: Theom, Inc., San Jose, CA (US)

( * ) Notice: Subject to any disclaimer, the term of this patent is extended or adjusted under 35 U.S.C. 154(b) by 73 days.

(21) Appl. No.: 18/367,894

(22) Filed: Sep. 13, 2023

(65) Prior Publication Data

US 2024/0232341 A1    Jul. 11, 2024

Related U.S. Application Data

(63) Continuation-in-part of application No. 18/203,045, filed on May 29, 2023, which is a continuation-in-part
(Continued)

(51) Int. Cl.
*G06F 21/55* (2013.01)
(52) U.S. Cl.
CPC ...... *G06F 21/554* (2013.01); *G06F 2221/034* (2013.01)
(58) Field of Classification Search
CPC . G06F 21/554; G06F 21/577; G06F 2221/034
See application file for complete search history.

(56) References Cited

U.S. PATENT DOCUMENTS 7,552,480 B1 * 6/2009 Voss ..................... G06F 21/577
713/150
2020/0314137 A1 * 10/2020 Tsitkin ................ H04L 63/1433
(Continued)

*Primary Examiner* — Thaddeus J Plecha

(57) ABSTRACT

In one aspect, In one aspect, a computerized method for automatic grading, impact analysis and mapping to the CIA triad, comprising: identifying a value of a plurality of data stores; associating the value back to an attack scenario such that a measure of impact with respect to attack progression or susceptibility now has a pecuniary value and generating a grading score; associating the grading score mapped to Confidentiality, Integrity and Availability (CIA) Triad; associating an attack progression with the pecuniary value and priority; identifying a progression of the attack; determining a time that is available for a response before a damage occurs to a system under attack; determining a stage of the attack in an attack kill chain, wherein for every stage of the attack as the progress happens, associating the pecuniary value and an impact for such a stage; and automatically calculates an overall data threat grade of the system.

10 Claims, 14 Drawing Sheets

Related U.S. Application Data of application No. 17/335,932, filed on Jun. 1, 2021, now Pat. No. 12,010,124.

(60)  Provisional application No. 63/439,579, filed on Jan. 18, 2023, provisional application No. 63/153,362, filed on Feb. 24, 2021.

(56)  References Cited

U.S. PATENT DOCUMENTS

2020/0329068 A1 *  10/2020  Findlay ............... H04L 63/1433
2025/0274480 A1 *   8/2025  Adivi .................. H04L 63/1425

* cited by examiner

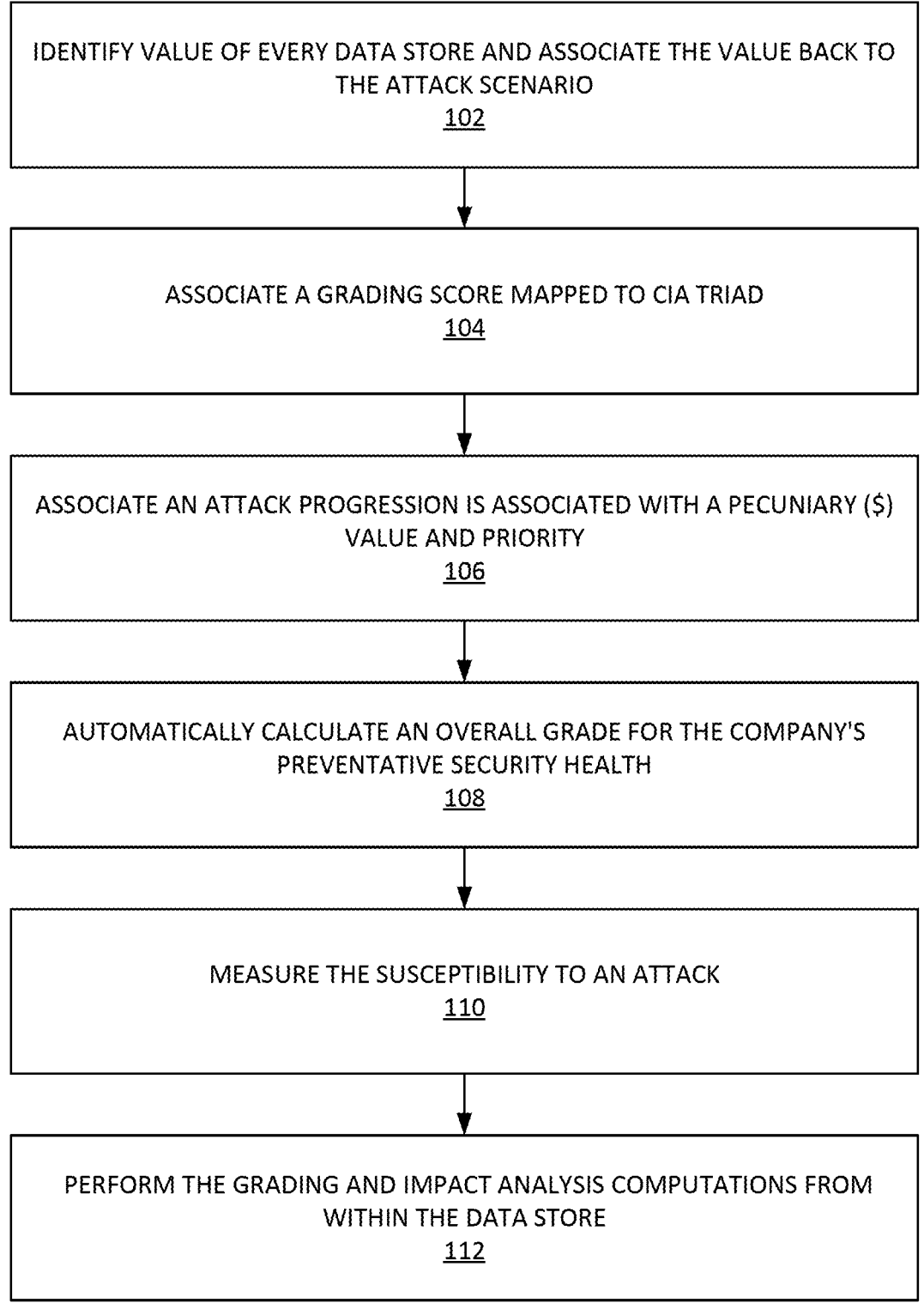

IDENTIFY VALUE OF EVERY DATA STORE AND ASSOCIATE THE VALUE BACK TO THE ATTACK SCENARIO
102

ASSOCIATE A GRADING SCORE MAPPED TO CIA TRIAD
104

ASSOCIATE AN ATTACK PROGRESSION IS ASSOCIATED WITH A PECUNIARY ($) VALUE AND PRIORITY
106

AUTOMATICALLY CALCULATE AN OVERALL GRADE FOR THE COMPANY'S PREVENTATIVE SECURITY HEALTH
108

MEASURE THE SUSCEPTIBILITY TO AN ATTACK
110

PERFORM THE GRADING AND IMPACT ANALYSIS COMPUTATIONS FROM WITHIN THE DATA STORE
112

USE A COMBINATION OF MACHINE LEARNING AND SECURITY ANALYSIS ON DATA & ACCESS IDENTITY FOR SAAS DATA STORES
402

ENABLE THE END CUSTOMERS' GOVERNANCE AND DATA ASSURANCE TEAMS TO DEFINE THEIR OWN CUSTOM INSIGHT ENGINES
404

SELECT A SET OF FEATURES ON WHICH MACHINE LEARNING IS PERFORMED
1102

SETS OF FEATURES ARE USED BY A PLURALITY OF ML ENGINES IS TO BUILD A HIGH FIDELITY ATTACK DETECTION ENGINE
1104

FEATURES ARE NORMALIZED TO DETECT ATTACKS IN ANY TYPE OF DATA LAKE OR DATA WAREHOUSE
1106

TRAIN AND BASELINES THE BEHAVIOR OF EACH DATABASE AND TABLE INDIVIDUALLY IN EVERY ENTITY'S ENVIRONMENT
1108

LEARN A BASELINE PER ACCESS PER DATA UNIT, THIS PRODUCES A HIGH-FIDELITY ATTACK DETECTION
1110

TRANSPARENTLY LEARN A NEW BASELINE FOR EVERY DATABASE, WHEN IT IS ONBOARDED
1112

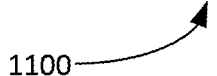

METHODS AND SYSTEMS FOR AUTOMATIC GRADING, IMPACT ANALYSIS AND MAPPING TO THE CIA TRIAD

CLAIM OF PRIORITY

This application claims priority to U.S. Provisional Application No. 63/439,579, filed on 18 Jan. 2023 and titled DATA STORE ANALYSIS METHODS AND SYSTEMS. This provisional application is hereby incorporated by reference in its entirety.

This application claims priority to the U.S. patent application Ser. No. 18/203,045, filed on 29 May 2023 and titled METHODS AND SYSTEMS FOR ATTACK GENERATION ON DATA LAKES. The U.S. patent application Ser. No. 18/203,045 is hereby incorporated by reference in its entirety.

U.S. patent application Ser. No. 18/203,045 claims priority to the U.S. patent application Ser. No. 17/335,932, filed on Jun. 1, 2021 and titled METHODS AND SYSTEMS FOR PREVENTION OF VENDOR DATA ABUSE. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to cloud-platform security and, more specifically, for automatic grading, impact analysis and mapping to the CIA triad.

BACKGROUND

Data is the most critical asset of any enterprise. Almost all cyber security tools and techniques invented and deployed to date focus on protecting the data by proxy. They either focus on protecting the server/application or the endpoints (e.g. desktop, laptop, mobile, etc.) and, by proxy, assume the data is protected. A paradox in the cyber security industry is that data breaches are growing and measured by any metric with every passing day. Despite more money and resources being deployed into cyber security solutions, existing approaches must be revised, begging for a new solution.

Additionally, there is a need to quantify various attacks, data exfiltrations, phishing susceptibility, etc. Moreover, as organizations develop processes or solutions to improve overall security posture, furthermore, there is a need for enterprises to prioritize these attack scenarios. Enterprises may have a need to associate a pecuniary ($) value or a financial value to the impact analysis while also understanding the grading and measurements for the impact.

These problems press a need for automatic grading and impact analysis measurement system that dynamically adapts to the changing security situations, whether from a malicious actor/attack perspective or from the context of the security teams which are building defense or improving the processes.

SUMMARY OF THE INVENTION

In one aspect, a computerized method for automatic grading, impact analysis and mapping to the CIA triad, comprising: identifying a value of a plurality of data stores; associating the value back to an attack scenario such that a measure of impact with respect to attack progression or susceptibility now has a pecuniary value and generating a grading score; associating the grading score mapped to Confidentiality, Integrity and Availability (CIA) Triad; associating an attack progression with the pecuniary value and priority; identifying a progression of the attack; determining a time that is available for a response before a damage occurs to a system under attack; determining a stage of the attack in an attack kill chain, wherein for every stage of the attack as the progress happens, associating the pecuniary value and an impact for such a stage; and automatically calculates an overall data threat grade of the system.

BRIEF DESCRIPTION OF THE DRAWINGS

FIG. 1 illustrates an example process for automatic grading, impact analysis and mapping to the CIA triad, according to some embodiments.

FIG. 8 illustrates an example screenshot of a prevalence hash 800, according to some embodiments.

FIG. 11 illustrates an example process for integrating machine learning into the other processes discussed herein, according to some embodiments.

Figure 2:
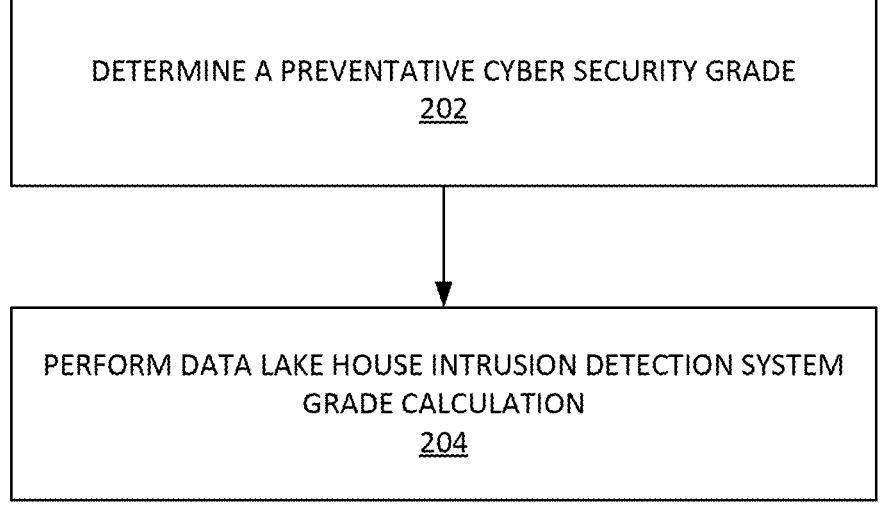
FIG. 2 illustrates an example process for implementing a SaaS data store and data lake house cyber security hygiene posture analysis, according to some embodiments.

The Figures described above are a representative set and are not exhaustive with respect to embodying the invention.

DESCRIPTION

Disclosed are a system, method, and article for detecting data abuse and data exfiltration in data lakes cloud warehouses. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, one skilled in the relevant art can recognize that the invention may be practiced without one or more of the specific details or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

CIA triad (confidentiality, integrity and availability) of information security.

Cloud computing is the on-demand availability of computer system resources, especially data storage (e.g. cloud storage) and computing power, without direct active management by the user.

Cloud database is a database that typically runs on a cloud computing platform and access to the database is provided as-a-service.

Cloud storage is a model of computer data storage in which the digital data is stored in logical pools, said to be on "the cloud". The physical storage spans multiple servers (e.g. in multiple locations), and the physical environment is typically owned and managed by a hosting company. These cloud storage providers can keep the data available and accessible, and the physical environment secured, protected, and running.

Cloud data warehouse is a cloud-based data warehouse. Cloud data warehouse can be used for storing and managing large amounts of data in a public cloud. Cloud data warehouse can enable quick access and use of an entity's data.

Command and control can be a technique used by threat actors to communicate with compromised devices over a network.

Cyber Kill Chain® framework is part of the Intelligence Driven Defense® model for identification and prevention of cyber intrusions activity. The model identifies what the adversaries must complete in order to achieve their objective.

Dark web is the World Wide Web content that exists on darknets: overlay networks that use the Internet but require specific software, configurations, or authorization to access. Through the dark web, private computer networks can communicate and conduct business anonymously without divulging identifying information, such as a user's location.

Data Bounty can be a financial or other reward available for sourcing a specific dataset.

DBaaS (Database as a Service) can be a cloud computing service that provides access to and use a cloud database system.

Data lake is a system or repository of data stored in its natural/raw format. A data lake can be object blobs or files. A data lake is usually a single store of data including raw copies of source system data, sensor data, social data etc. A data lake can include various transformed data used for tasks such as reporting, visualization, advanced analytics, and machine learning. A data lake can include structured data from relational databases (rows and columns), semi-structured data (e.g. CSV, logs, XML, JSON), unstructured data (e.g. emails, documents, PDFs) and binary data (e.g. images, audio, video). A data lake can be established "on premises" (e.g. within an organization's data centers) or "in the cloud" (e.g. using cloud services from various vendors).

Malware is any software intentionally designed to disrupt a computer, server, client, or computer network, leak private information, gain unauthorized access to information or systems, deprive access to information, or which unknowingly interferes with the user's computer security and privacy. Researchers tend to classify malware into one or more sub-types (e.g. computer viruses, worms, Trojan horses, ransomware, spyware, adware, rogue software, wiper and keyloggers).

MITRE ATT&CK is a guideline for classifying and describing cyberattacks and intrusions. It was created by the Mitre Corporation. It identifies tactics that indicate an attack is in progress. The framework consists of 14 tactics categories consisting of "technical objectives" of an adversary. Examples include privilege escalation and command and control. These categories are then broken down further into specific techniques and sub-techniques.

NIST Cybersecurity Framework is a set of guidelines for mitigating organizational cybersecurity risks, published by the US National Institute of Standards and Technology (NIST) based on existing standards, guidelines, and practices. The framework "provides a high-level taxonomy of cybersecurity outcomes and a methodology to assess and manage those outcomes", in addition to guidance on the protection of privacy and civil liberties in a cybersecurity context.

Privilege escalation can be the act of exploiting a bug, a design flaw, or a configuration oversight in an operating system or software application to gain elevated access to resources that are normally protected from an application or user. The result can be that an application with more privileges than intended by the application developer or system administrator can perform unauthorized actions.

Software as a service (SaaS) is a software licensing and delivery model in which software is licensed on a subscription basis and is centrally hosted. SaaS is part of cloud computing.

Cloud computing is the on-demand availability of computer system resources (e.g. data storage/cloud storage, etc.) and computing power, without direct active management by the user. Large clouds often have functions distributed over multiple locations, each of which is a data center. Cloud computing can include the sharing of resources to achieve coherence.

Security orchestration, automation, and response (SOAR) can be a set of applications that collect data from disparate sources and automatically respond to security events. SOAR collects inputs monitored by the security operations team such as alerts from the SIEM system, TIP, and other security technologies and helps define, prioritize, and drive standardized incident response activities. Organizations uses SOAR platforms to improve the efficiency of digital security operations. SOAR enables administrators to handle security alerts without the need for manual intervention. When the network tool detects a security event, depending on its nature, SOAR can raise an alert to the administrator or take some other action.

Tactics, techniques, and procedures (TTPs) are the "patterns of activities or methods associated with a specific threat actor or group of threat actors.

EXAMPLE METHODS

FIG. 1 illustrates an example process for automatic grading, impact analysis and mapping to the CIA triad, according to some embodiments.

In step 102, process 100 identifies the value of every data store and can associate the value back to the attack scenario. In this way, every measure of impact with respect to attack progression or susceptibility now has a pecuniary ($) value. This can leads to better prioritization of scenarios. A grading score (e.g. see infra) can also be generated.

In step 104, process 100 associates a grading score mapped to CIA Triad (Confidentiality, Integrity and Availability). This steps enables organizations (and/or other entities) to obtain a clear picture of the current state of security and susceptibility to data breaches. This step also provides organizations a quantification which they can used to track progress and impact.

In step 106, process 100 associate an attack progression is associated with a pecuniary ($) value and priority. Process 100 identifies how far the attack has progressed and how much time is available for response before the damage is done. Process 100 identifies the stage of the attack in the attack kill chain. For every stage of the attack as the progress happens, process 100 associates $ value and impact for such a stage.

In step 108, process 100 automatically calculates an overall grade for the company's preventative security health (e.g. security hygiene). The grade is calculated across all the company's data assets in the cloud and SaaS data stores. It informs the cyber security executive team how well the company is doing in keeping its security hygiene posture up. A good posture indicates fewer escalations and panic events. A good posture also indicates companies can drive down their cyber insurance premiums. Users can also know what assets need more protection, focus, etc. In this way, process 100 helps management obtain a bird's eye view of their investments and any alignment needed. Finally, process 100 gives them an over grade of how well they are doing versus their peers.

In step 110, process 100 measures the susceptibility to an attack. Process 100 automatically calculates the company's overall data threat grade. The grade identifies all attacks in the data stores and how far the attack has progressed. The further the attack has progressed in achieving its goal, the more serious it is. This score should, in an ideal state, be an A+.

In step 112, process 100 performs the grading and impact analysis computations from within the data store. The factors that leads to the grades and the understanding of impact analysis are done without taking any data out of the enterprise customer's data store which is a unique implementation novelty.

FIG. 2 illustrates an example process 200 for implementing a SaaS data store and data lake house cyber security hygiene posture analysis, according to some embodiments. The data lake house cyber security hygiene posture analysis can be preventative.

In step 202, process 200 can determine a Preventative cyber security (e.g. posture) grade.

Figure 3:
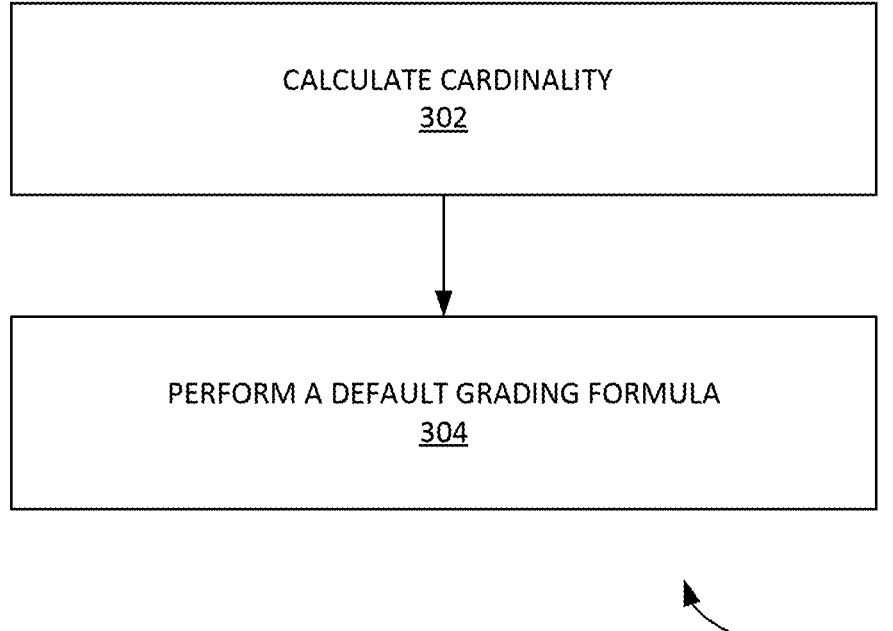
FIG. 3 illustrates an example process for calculating a grade score, according to some embodiments.

FIG. 3 illustrates an example process 300 for calculating a grade score, according to some embodiments. $x = 1 - [100 * (C_{HRh}/C_H + C_{HRM}/C_H + C_{HRL}/C_H) + 10 * (C_{MRh}/C_M + C_{MRM}/C_M + C_{MRL}/C_M) + (C_{LRH}/C_L + C_{LRM}/C_L + C_{LRL}/C_L))/111]$ Here, C is either Cardinality of Entities associated with a $\text{Category}_{High|Medium|Low}$ OR The Sum of the financial value based $ for the Entities in High|Medium|Low.

In step 302, process 300 calculates cardinality. In some embodiments, the default option can be cardinality. The user can toggle a button on the user interface to obtain either the cardinality or the asset value.

The default grading formula based on cardinality is:

$$X = [$$
(Cardinality of High Entities with Severity 1 issues/Cardinality of all High Entities + Cardinality of High Entities with Severity 2 issues/Cardinality of all High Entities + Cardinality of High Entities with Severity 3 issues/Cardinality of all High Entities + Cardinality of High Entities with Severity 4/Cardinality of all High Entities) * 100 +

(Cardinality of Medium Entities with Severity 1 issues/Cardinality of all Medium Entities + Cardinality of Medium Entities with Severity 2 issues/Cardinality of all Medium Entities + Cardinality of Medium Entities with Severity 3 issues/Cardinality of all Medium Entities + Cardinality of Medium Entities with Severity 4/Cardinality of all High Entities) * 10 +

(Cardinality of Low Entities with Severity 1 issues/Cardinality of all Low Entities + Cardinality of Low Entities with Severity 2 issues/Cardinality of all Low Entities + Cardinality of Low Entities with Severity 3 issues/Cardinality of all Low Entities + Cardinality of Low Entities with Severity 4/Cardinality of all Low Entities) * 1.

In step 304, process 300 can perform a default grading formula. The default grading formula based on the $ value is similar to the cardinality formula. It is noted that a user can replace cardinality with $ value for the entities.

In one example, a Grade assignment can be determined as follows:

Grade = A+ if 0.97 <= X <= 1
Grade = A+ if 0.93 <= X <= .96
Grade = A- if 0.9 <= X <= .92
Grade = B+ if 0.87 <= X <= .89
Grade = B if 0.83 <= X <= .86
Grade = B- if 0.8 <= X <= .82
Grade = C+ if 0.77 <= X <= .99
Grade = C if 0.73 <= X <= .76
Grade = C- if 0.70 <= X <= .72
Grade = D+ if 0.67 <= X <= .69
Grade = D if 0.65 <= X <= .66
Grade = D- if 0.65 <= X.

Figure 4:
FIG. 4 illustrates an example process for providing built-in preventative cyber security insights, according to some embodiments.

FIG. 4 illustrates an example process 400 for providing built-in preventative cyber security insights, according to some embodiments. In step 402, process 400 delivers for its customers using a combination of machine learning and security analysis on the data and access identity for SaaS Data Stores. These are by no means exhaustive. Besides the built-in insight engines, in step 404, process 400 enables the end customers' governance and data assurance teams to define their own custom insight engines.

Figure 5:
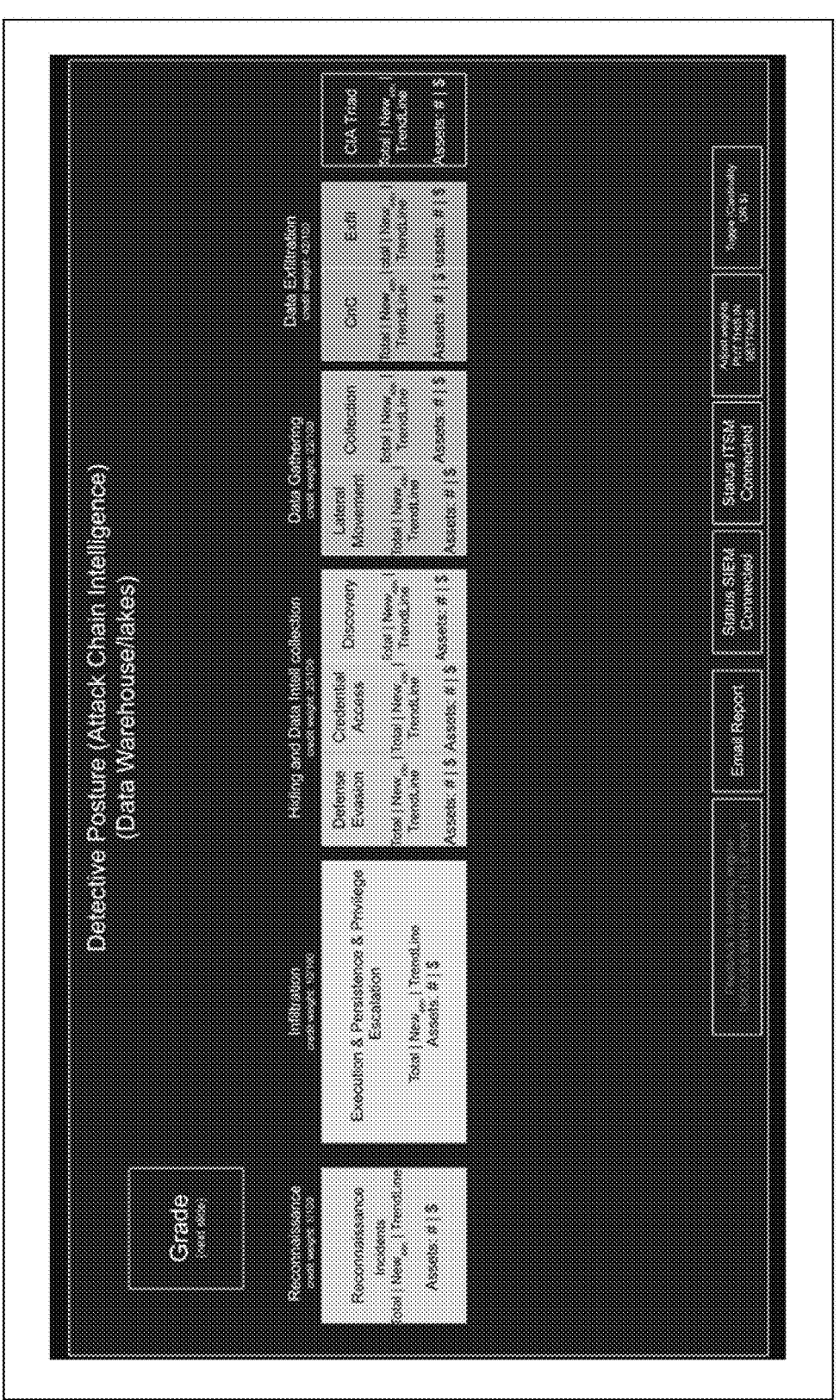
FIG. 5 provides additional information that can be used to implement data lake house intrusion detection system grade calculation, according to some embodiments.
Figure 6:
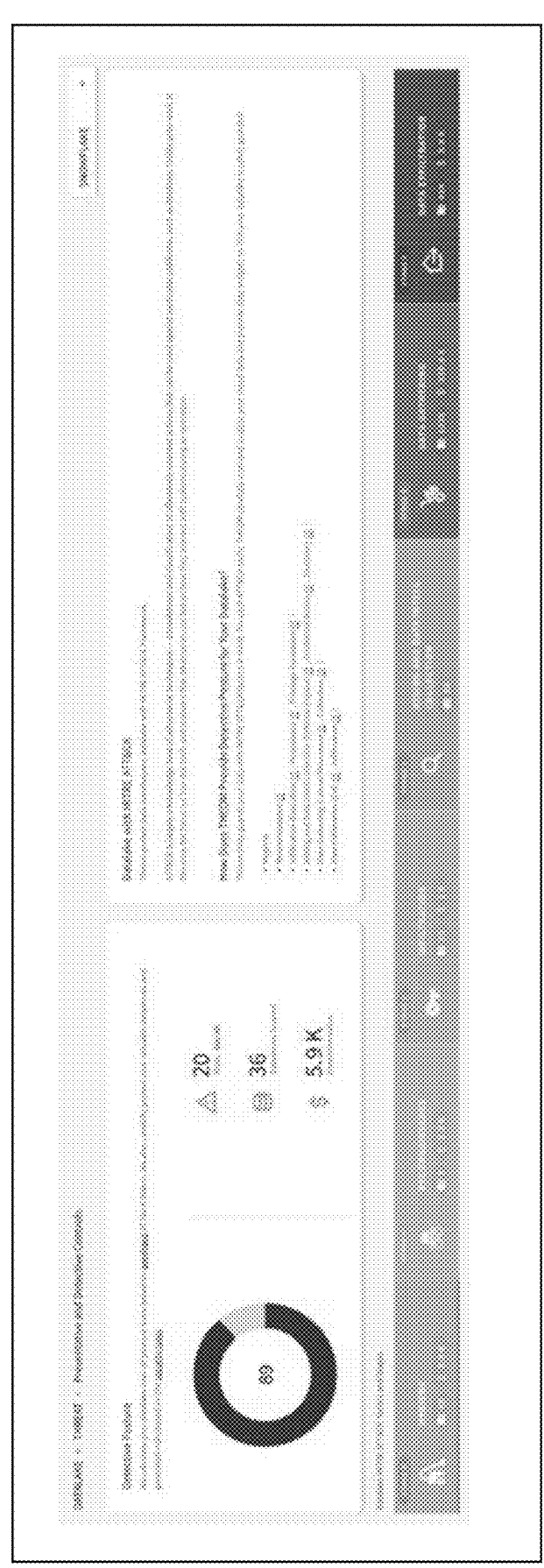
FIG. 6-7 illustrate example user interfaces for implementing implement data lake house intrusion detection system grade calculation, according to some embodiments.
Figure 7:
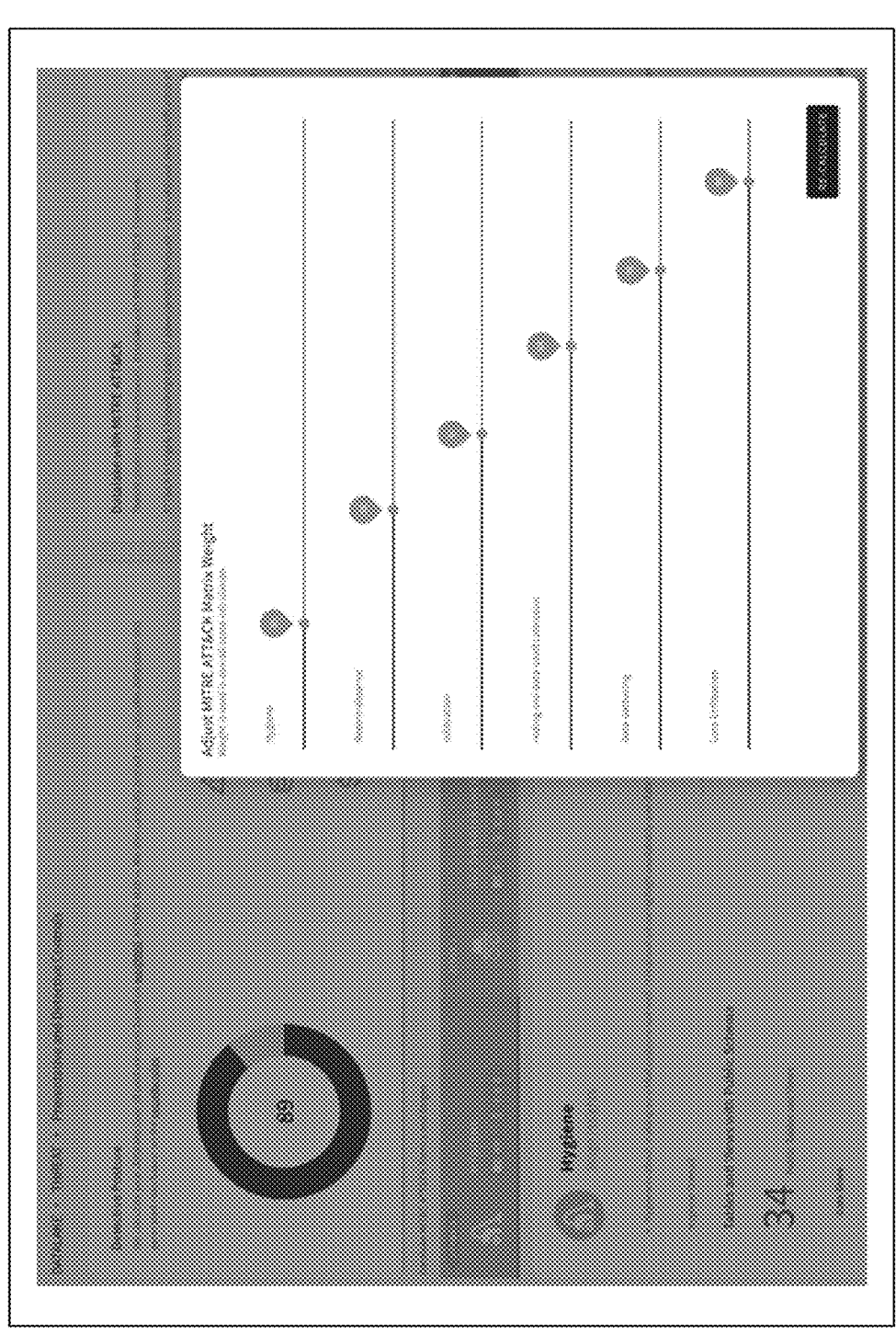

Returning to process 200, in step 204, a data lake house intrusion detection system grade calculation is performed. FIG. 5 provides additional information that can be used to implement data lake house intrusion detection system grade calculation, according to some embodiments. FIG. 6-7 illustrate example user interfaces for implementing implement data lake house intrusion detection system grade calculation, according to some embodiments.

Process 200 can calculate the normalizer as follows: Normalizer=1/Stage Event Count Historical Max. Process 200 can saturate it or put smart seed defaults for each stage. For example, the login attempts fails start with 100 a day, etc. Process 200 can Stage numeric grade=1−[stage event count*normalizer].

Process 200 puts in smart seed defaults for each stage. Every seed default is computed based on the attack detection phase and the defaults for stages closer to the actual breach is always a higher weight.

The amplification weight for each stage is defined as the inverse inclusion probability. Use that to scale. FIG. 7 shows the default amplification weights for each stage. The user can change the weights if needed. FIG. 7 shows the default contribution weights for the overall impact analysis and grading. As seen, it provides a way for the user to override thereby bringing in human judgment which can guide the overall grading.

Process 200 can calculate the Total numeric GPA=(Stage Weight Credit*Stage Grade numeric score)/(Total Stage Grade numeric score).

In some example embodiments, Process 200 can perform the conversion to the Letter GPA uses the following table:

| Letter | Grade Percentage Or decimal | GRADE NUMERIC SCORE |
|---|---|---|
| A+ | 97-100 | 4.0 |
| A | 93-96 | 4.0 |
| A– | 90-92 | 3.7 |
| B+ | 87-89 | 3.3 |
| B | 83-86 | 3.0 |
| B– | 80-82 | 2.7 |
| C+ | 77-79 | 2.3 |
| C | 73-76 | 2.0 |
| C– | 70-72 | 1.7 |
| D+ | 67-69 | 1.3 |

-continued

| Letter | Grade Percentage Or decimal | GRADE NUMERIC SCORE |
|---|---|---|
| D | 65-66 | 1.0 |
| E/F | Below 65 | 0.0 |

FIG. 8 illustrates an example screenshot of a prevalence hash 800, according to some embodiments. Prevalence hash 800 helps reduce the noise due to similar repeated events happening within the environment. With prevalence hash 800, example methods can be aware which signals to consider and which ones to ignore (e.g. if they are very common within the enterprise environment).

Figure 9:
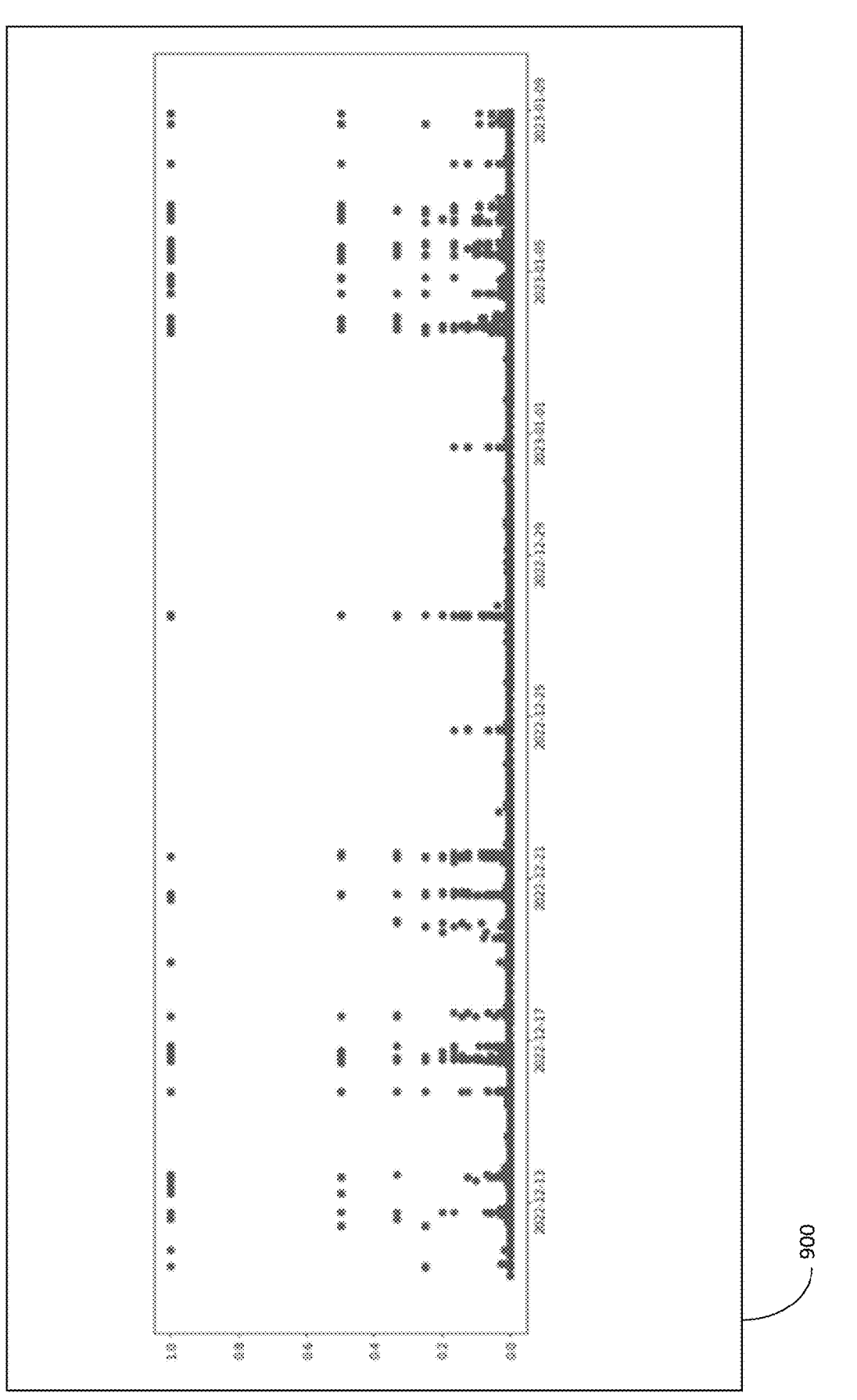
FIGS. 9 and 10 illustrates screenshots of a global prevalence for all query types over a period of a time, according to some embodiments.
Figure 10:
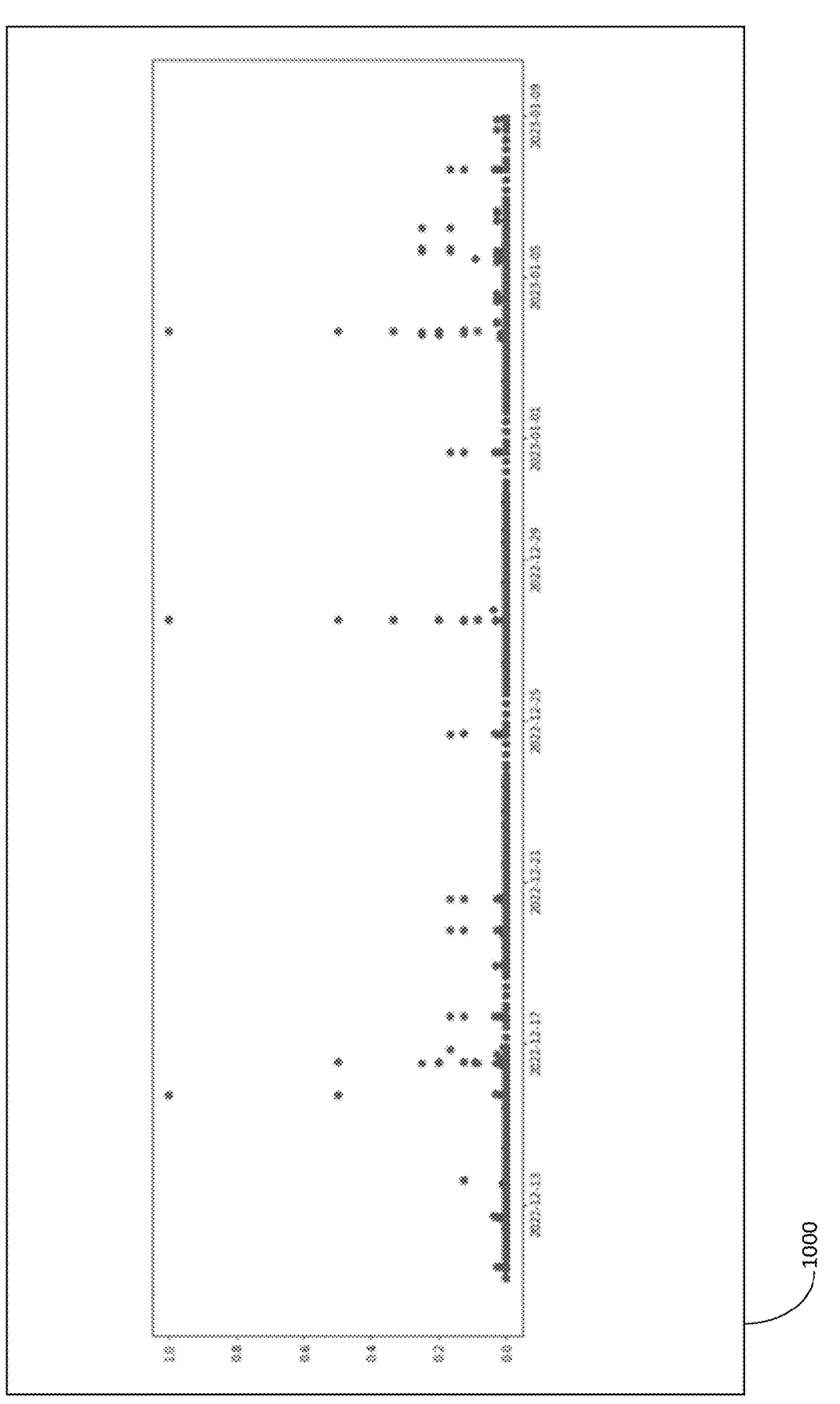

FIGS. 9 and 10 illustrates screenshots 900 and 1000 of a global prevalence for all query types over a period of a time, according to some embodiments. In the present example, the time period is a month. FIG. 10 shows a global prevalence for select query types over last month. Depending on the attack stage detection the appropriate features are used as discussed below in the attack sections. For example it uses direct_tables_access and base_tables_access.

Example Machine Learning Implementations

FIG. 11 illustrates an example process 1100 for integrating machine learning into the other processes discussed herein, according to some embodiments. In step 1102, process 1100 carefully selects a set of features on which machine learning is performed. These normalized sets of features can work across the wide variety of Data warehouses, Data Lakes. Process 1100 helps learn the right baseline for the behavior of a human or a machine identified within the enterprise. This baseline helps determine the right defaults and weights that are needed to compute the grades and coefficients.

These sets of features can be used by a plurality of ML engines to build a high-fidelity attack detection engine in step 1104. This can be done with absolutely low false positives and negatives at the lowest possible cost and storage. Additionally, the features are normalized to detect attacks in any type of data lake or data warehouse in step 1106.

In addition, in step 1108, process 1100 trains and baselines the behavior of each database and table individually in every entity's environment. This ensures that models are personalized and tailored to each customer's environment, further the models are specific to the particular database of the entity. For example a test database of an entity may have a very different access baseline as compared to a CRM production database of the same entity. In step 1110, process 1100 learns a baseline per access (e.g. role and user) per data unit (e.g. database and table), this produces a high-fidelity attack detection.

The following equations and variables can be utilized by process 1100 in some examples:
Training Period—Lookback period;
Min 90 days;
Ideal 6 months
Training vs Predicting;
1st ⅔ of the lookback period is used for training;
End ⅓ of the lookback period is used for predicting;
When a New Data Store or a New Database is Onboarded into process 1100.
Process 1100 would not have a baseline for the new datastore. Even though the entity may have been using process 1100 for other databases (e.g. Snowflake, etc.). Any predictions and detections process 1100 provides may not have the fidelity entities may be used to. To address this scenario, process 100 transparently learns a new baseline for every database, when it is onboarded in step 1112. Process 1000 triggers training for that database.

In one example, process 1100 uses the last 90 days or longer of access and operational data for the datastore.

Learning Feedback—reinforced learning;

False positive indication from the UI drives whitelisting (data relabeling); and Feedback can be given per event—that is a row per tile in the UI.

Process 1100 can be utilized by other processes that implement the automatic grading, impact analysis and mapping to the CIA triad.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, which operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

Other Example Embodiments

Figure 12:
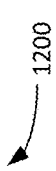
FIGS. 12-13 provide additional screenshots for a dashboard, according to some embodiments.
Figure 13:
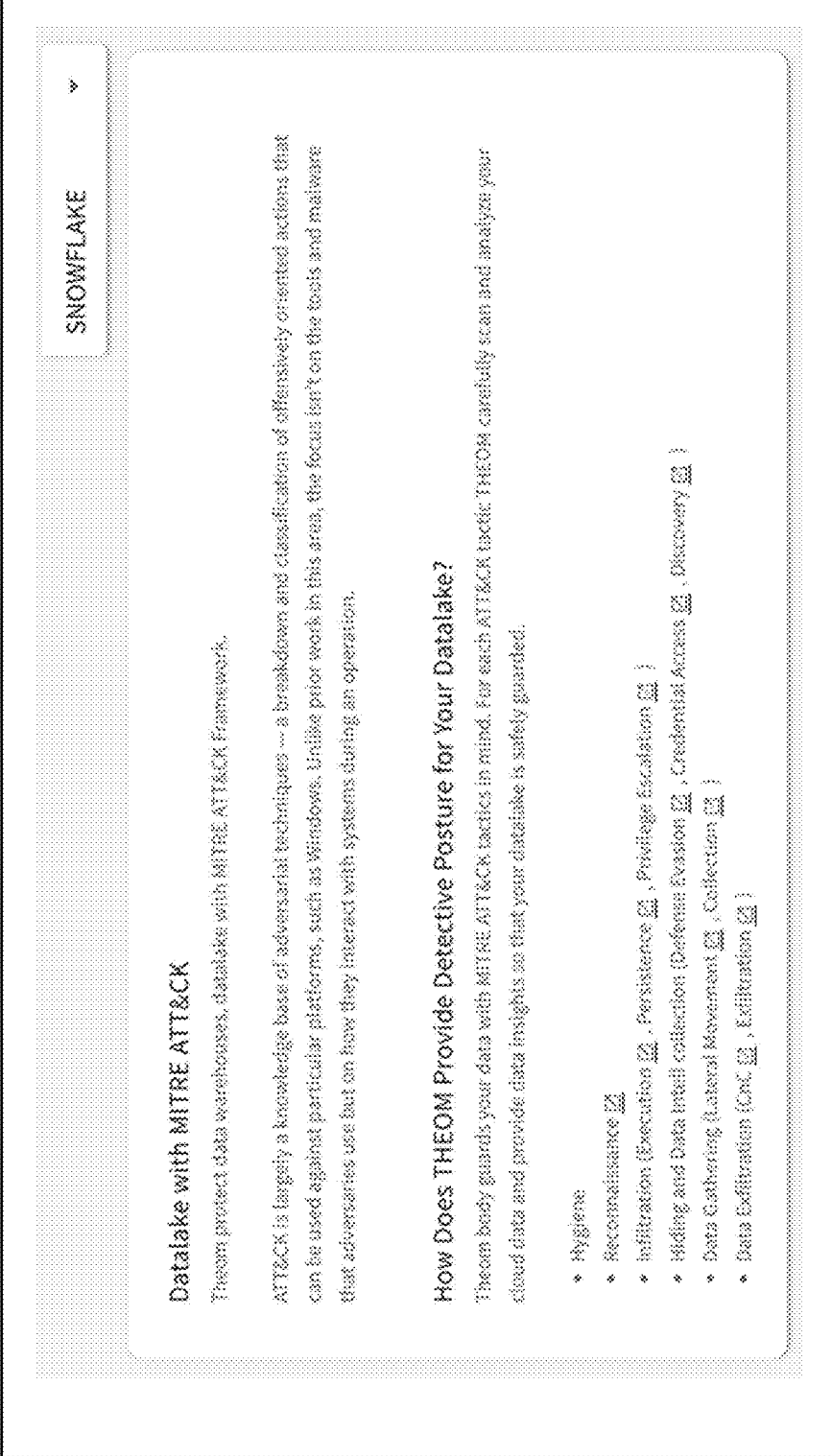

FIGS. 12-13 provide additional screenshots 1200-1300 for a dashboard, according to some embodiments.

FIG. 12 describes how the detective posture is computed based on the weights and grades from the constituent MITRE ATT&CK framework stages.

FIG. 13 indicates the key stages that contribute to the detective posture and grade. The following are the key stages that contribute to the detective posture grade and weights, inter alia: Hygiene, Reconnaissance, Infiltration (Execution, Persistence, Privilege Escalation), Hiding and Data Intel collection (Defense Evasion, Credential Access, Discovery), Data Gathering (Lateral Movement, Collection), and Data Exfiltration (CnC, Exfiltration).

Figure 14:
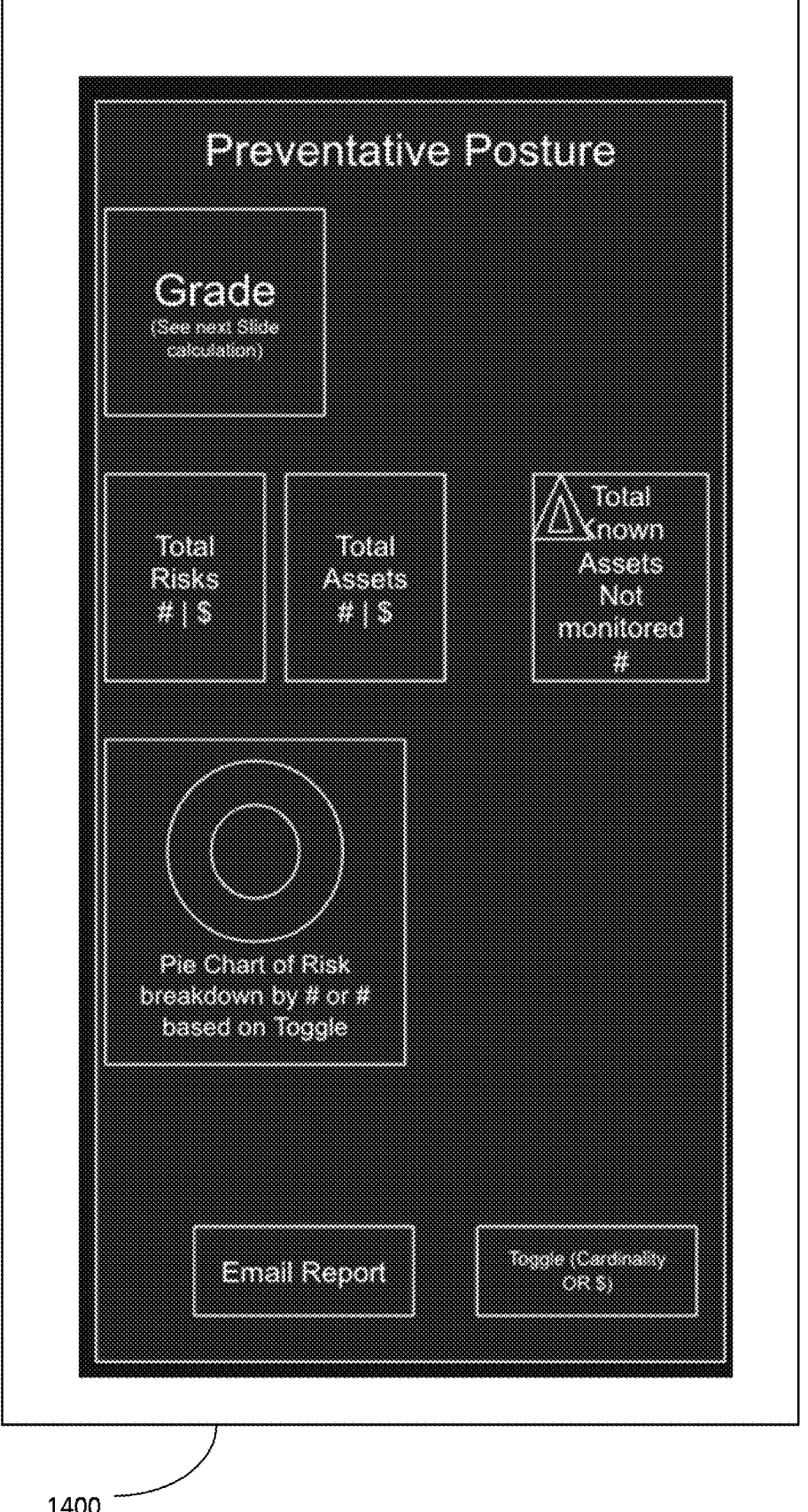
FIG. 14 illustrates an example wire diagram of how the posture score, according to some embodiments.

FIG. 14 illustrates an example wire diagram 1400 of how the posture score, according to some embodiments. Preventive posture illustrates the score from a preventive standpoint. As seen in FIG. 14, the focus on preventive posture is to reduce risk and build controls that can prevent the attack from happening. An important aspect of this consideration is to also be aware of how many assets are under the coverage for various processes described herein. This aspect is also factored into the grading as if there are too many data assets that are not being monitored, that would indicate that the risks are high as the risk of the unknown exists.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be computerized and embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized method for automatic grading, impact analysis and mapping to a Confidentiality, Integrity, and Availability (CIA) triad, comprising:

identifying a value for a data store of a plurality of data stores;

associating the value back to an attack scenario such that a measure of impact with respect to attack progression or susceptibility has a pecuniary value;

associating a grading score mapped to the CIA triad;

associating an attack progression with the pecuniary value and priority;

identifying a progression of an attack;

determining a time that is available for a response before a damage occurs to a system under attack;

determining a stage of the attack in an attack kill chain, wherein for a stage of the attack, associating the pecuniary value and an impact for the stage; and automatically calculating an overall data threat grade of the system.

2. The computerized method of claim 1 further comprising:

automatically calculating an overall grade for a preventative security health of the system under attack.

3. The computerized method of claim 2, wherein the overall grade is calculated across all of a set of data assets in a cloud computing environment of the system.

4. The computerized method of claim 2, wherein the overall grade is calculated across all of a set of data assets in the plurality of data stores.

5. The computerized method of claim 4, wherein the overall data threat grade identifies attacks in the data stores and how far the attack has progressed.

6. The computerized method of claim 5, further comprising:

performing a plurality of grading and impact analysis computations from within the data store.

7. The computerized method of claim 6, wherein the impact analysis of factors that leads to grades is performed without taking any data out of the data store.

8. The computerized method of claim 7 further comprising:

performing a default grading formula.

9. The computerized method of claim 1, wherein the grading score is calculated using a cardinality calculated using:

$X = [($Cardinality of High Entities with

Severity 1 issues/Cardinality of all High Entities$+$

-continued

Cardinality of High Entities with Severity 2 issues/Cardinality of all High Entities $+$ Cardinality of High Entities with Severity 3 issues/Cardinality of all High Entities $+$ Cardinality of High Entities with Severity 4/Cardinality of all High Entities$) *$ $100 + ($Cardinality of Medium Entities with Severity 1 issues/Cardinality of all Medium Entities $+$ Cardinality of Medium Entities with Severity 2 issues/Cardinality of all Medium Entities $+$ Cardinality of Medium Entities with Severity 3 issues/Cardinality of all Medium Entities $+$ Cardinality of Medium Entities with Severity 4/Cardinality of Medium Entities$) *$ $10 + ($Cardinality of Low Entities with Severity 1 issues/Cardinality of all Low Entities $+$ Cardinality of Low Entities with Severity 2 issues/Cardinality of all Low Entities $+$ Cardinality of Low Entities with Severity 3 issues/Cardinality of all Low Entities $+$ Cardinality of Low Entities with Severity 4/Cardinality of all Low Entities$) * 1.$ wherein High, Medium, and Low Entities are classifications of the plurality of data stores based on business value, and wherein Severity 1 through 4 correspond to a classification of identified security threats.

10. A computerized method for automatic grading, impact analysis and mapping to a Confidentiality, Integrity, and Availability (CIA) triad, comprising:

identifying a value for a data store of a plurality of data stores;

associating the value back to an attack scenario such that a measure of impact with respect to attack progression or susceptibility has a pecuniary value;

associating a progress of an attack of a system with the pecuniary value and priority;

determining a stage of the attack in an attack kill chain and associating the pecuniary value and an impact for the stage; and automatically calculating an overall data threat grade of the system.

* * * * *